(12) United States Patent
Ooba et al.

(10) Patent No.: US 11,278,997 B2
(45) Date of Patent: Mar. 22, 2022

(54) MACHINE SYSTEM PERFORMING WORKPIECE TRANSPORT CONTROL

(71) Applicant: Fanuc Corporation, Yamanashi (JP)

(72) Inventors: Masafumi Ooba, Yamanashi (JP); Kentaro Koga, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 37 days.

(21) Appl. No.: 16/992,388

(22) Filed: Aug. 13, 2020

(65) Prior Publication Data
US 2021/0094135 A1    Apr. 1, 2021

(30) Foreign Application Priority Data

Sep. 27, 2019  (JP) .............................. JP2019-177801
Jul. 6, 2020   (JP) .............................. JP2020-116509

(51) Int. Cl.
*B23Q 15/013*   (2006.01)
*B23Q 15/22*    (2006.01)
*B23Q 17/22*    (2006.01)
*B23Q 17/20*    (2006.01)

(52) U.S. Cl.
CPC ......... *B23Q 15/013* (2013.01); *B23Q 15/225* (2013.01); *B23Q 17/20* (2013.01); *B23Q 17/22* (2013.01)

(58) Field of Classification Search
None
See application file for complete search history.

(56) References Cited

U.S. PATENT DOCUMENTS

2019/0291274 A1*  9/2019  Doan .................... B25J 9/1651

FOREIGN PATENT DOCUMENTS

| JP | 11090871 A   | 4/1999 |
| JP | 2005111607 A | 4/2005 |
| JP | 2007015055 A | 1/2007 |
| JP | 2012184102 A | 9/2012 |
| JP | 2019150911 A | 9/2019 |

* cited by examiner

*Primary Examiner* — Ryan A Jarrett
(74) *Attorney, Agent, or Firm* — RatnerPrestia (57) ABSTRACT

A machine system includes a transport control section which controls transport of a workpiece based on a transport deceleration line provided upstream of an operation limit line of a machine in a direction of travel of the workpiece and a transport acceleration line provided upstream of the transport deceleration line, wherein the transport control section reduces a transport speed of the workpiece when the workpiece passes through the transport deceleration line in an incomplete operation state and increases the transport speed of the workpiece after the operation on the workpiece present between the operation limit line and the transport acceleration line has completed.

15 Claims, 7 Drawing Sheets

MACHINE SYSTEM PERFORMING WORKPIECE TRANSPORT CONTROL

CROSS-REFERENCE TO RELATED APPLICATIONS

This application is a new U.S. Patent Application that claims benefit of Japanese Patent Application No. 2019-177801, filed Sep. 27, 2019, and Japanese Patent Application No. 2020-116509, filed Jul. 6, 2020, the disclosures of which are incorporated herein by reference in their entirety for all purposes.

BACKGROUND OF THE INVENTION

1. Field of the Invention

The present invention relates to a machine system which performs operations on moving workpieces, and in particular, relates to a machine system which performs workpiece transport control.

2. Description of the Related Art

When an operation is performed on a moving workpiece using a machine such as an industrial robot, since the operation is performed on the workpiece within the operational area of the machine, in some cases the transport speed of the workpiece is controlled in accordance with the processing power of the machine. Regarding such a machine system, for example, the literature described below is well known.

Japanese Unexamined Patent Publication (Kokai) No. 11-090871 discloses that when the processing of a robot cannot keep up and a workpiece is missed, the speed of a conveyor is controlled to reduce the number of missed workpieces, and when the number of workpieces transported per unit time is less than a default value, causing the robot to wait, the conveyor speed is controlled so as to reduce the waiting time.

Japanese Unexamined Patent Publication (Kokai) No. 2005-111607 discloses that it is necessary to adjust the transport speed of a transport conveyor in accordance with the operational speed of a robot, reduce the play time of the robot, and make the optimal transport speed with no or little missing of workpieces.

Japanese Unexamined Patent Publication (Kokai) No. 2007-015055 discloses that a conveyor belt may be moved at a constant speed so that an imaging time interval is constant, or the speed of the belt may be changed based on the density of workpieces on the belt or the processing speed of the robot, and the imaging time interval may be changed in accordance with the speed of the belt.

Japanese Unexamined Patent Publication (Kokai) No. 2012-184102 discloses that sensors are provided on the upstream side of a robot in the transport direction of the workpieces and on the upstream side of the robot in the transport direction of trays, and by detecting the positions, shapes, and number of workpieces as well as the number and vacancy of the trays, if the transport amount of a workpiece on a pickup conveyor increases suddenly, the transport speed of a placement conveyor is increased in accordance with information from the sensors, and the optimal robot operation for such a transport speed is determined.

Japanese Unexamined Patent Publication (Kokai) No. 2019-150911 discloses that a transport machine is controlled based on optimum transport machine control parameters for a determined target operation, a robot operation plan is generated based on the determined operation target position and operation target transport machine optimal control parameters, and the robot is controlled in accordance with the generated control plan.

SUMMARY OF THE INVENTION

If a workpiece passes through a transport stop line provided downstream in the operational area of the machine in an incomplete operation state, the transport of the workpiece is stopped, and as soon as the operation for the workpiece downstream of the transport stop line is completed, the workpiece transport is restarted. In this case, if workpieces are densely crowded near the upstream side of the transport stop line, transport may step and restart repeatedly.

A technology which can suppress unnecessary transport control in a machine system which performs operations on moving workpieces is desired.

An aspect of the present disclosure provides a machine system comprising a machine which performs an operation on a workpiece passing through an operational area, and a transport control section which controls transport of the workpiece based on a transport deceleration line provided upstream of an operation limit line of the machine in a direction of travel of the workpiece and a transport acceleration line provided upstream of the transport deceleration line, wherein the transport control section reduces a transport speed of the workpiece when the workpiece passes through the transport deceleration line in an incomplete operation state and increases the transport speed of the workpiece after the operation on the workpiece present between the operation limit line and the transport acceleration line has completed.

DETAILED DESCRIPTION

The embodiments of the present disclosure will be described in detail below with reference to the attached drawings. In the drawings, identical or similar constituent elements are assigned the same or similar reference signs. Furthermore, the embodiments described below do not limit the technical scope of the invention or the definitions of the terms described in the claims.

Figure 1:
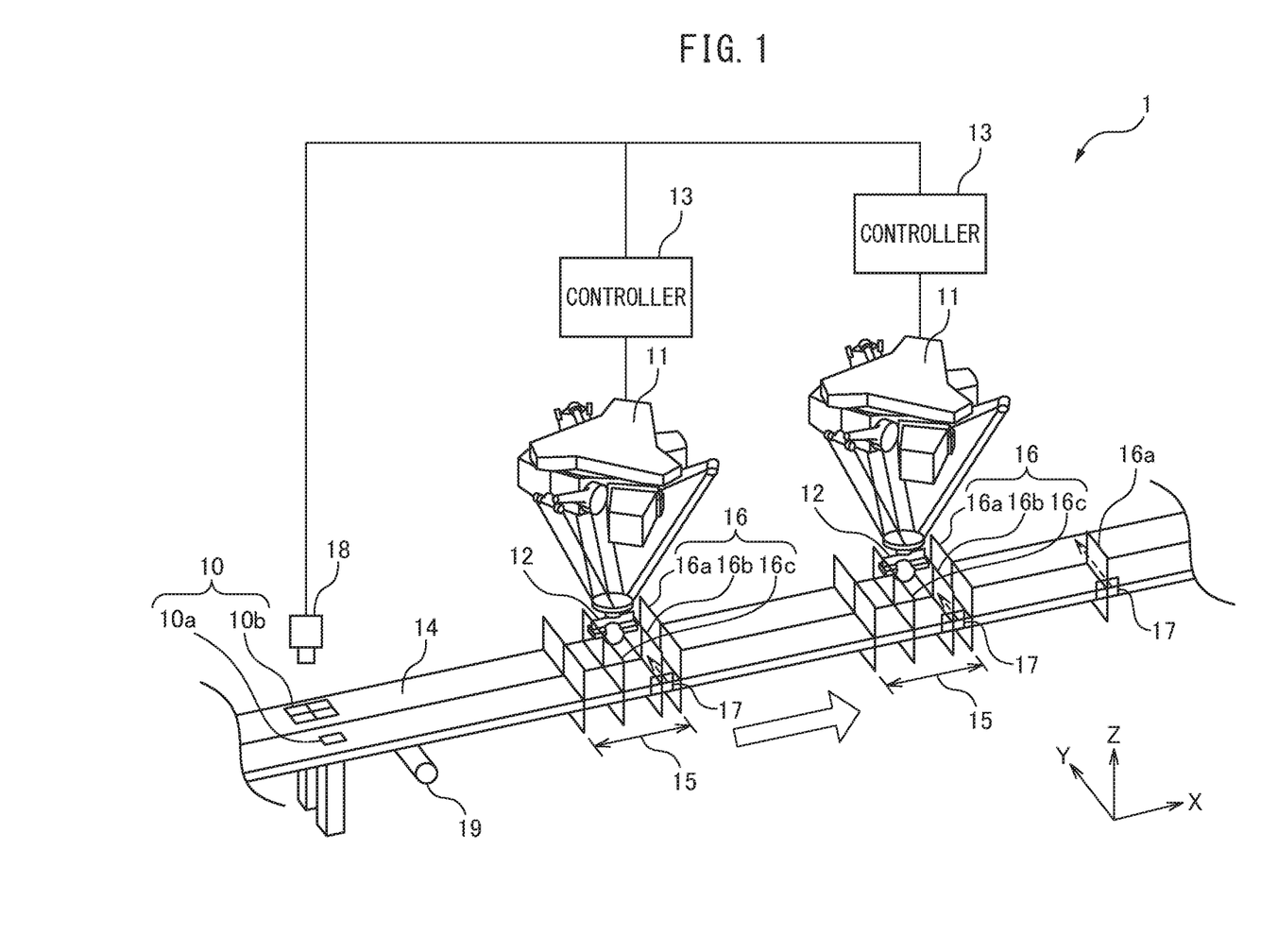
FIG. 1 is a perspective view showing the schematic configuration of a machine system according to an embodiment.

FIG. 1 shows the schematic configuration of a machine system 1 according to the present embodiment. The machine system 1 comprises one or a plurality of machines 11 which perform a predetermined operation on a workpiece 10, a tool 12 attached to the tip of the machine 11, and a controller 13 which controls the machine 11 and the tool 12. The workpiece 10 includes an article 10*a* or a tray 10*b* on which the article 10*a* can be placed, and is transported by a transport unit 14, such as a conveyor or AGV (automated guided vehicle) so as to arrive at an operational area 15 of the machine 11. The machine 11 is a parallel link robot, but may be another industrial robot such as an articulated robot or may be another industrial machine such as a machine tool or construction machine. The tool 12 is a suction hand, which is used for positioning, for example, four articles 10*a* on one tray 10*b*. However, the tool 12 may be a hand comprising a plurality of fingers or another tool, for example, a sealing tool, a welding tool, a screw fastening tool, a soldering tool, or a laser machining tool, depending on the contents of the operation on the workpiece 10. The controller 13 may be a known controller comprising a processor such as a CPU (central processing unit).

Figure 2:
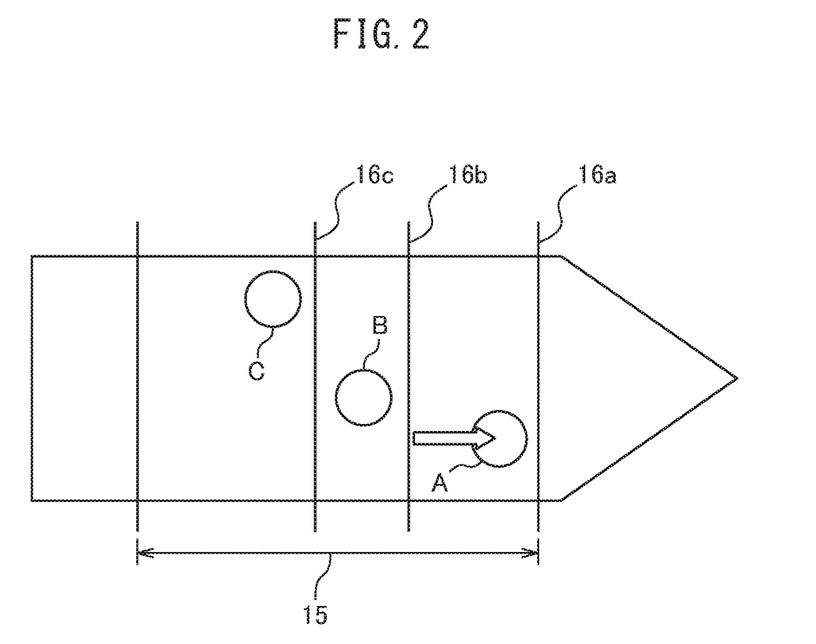
FIG. 2 is a plan view showing a transport control line according to the embodiment.

FIG. 2 shows a transport control line according to the present embodiment. As shown in FIGS. 1 and 2, the machine system 1 comprises three transport control lines for controlling the transport speed of a workpiece in accordance with the processing power of the machine 11. The first transport control line is an operation limit line 16*a* provided on the downstream side within the operational area 15 of the machine 11 in the direction of travel X of the workpiece, the second transport control line is a transport deceleration line 16*b* provided upstream of the operation limit line 16*a* in the direction of travel X of the workpiece, and the third transport control line is a transport acceleration line 16*c* provided upstream of the transport deceleration line 16*b* in the direction of travel X of the workpiece. These transport control lines may be provided for each machine 11, or may be provided, among the plurality of machines 11, for only the machine 11 provided most downstream. Furthermore, the operation limit line 16*a* may be provided further downstream than the operational area 15 of the machine 11 arranged most downstream (refer to the rightmost reference sign 16*a* of FIG. 1).

Referring to FIG. 2, the machine system 1 reduces the transport speed of the workpiece when, for example, a workpiece A has passed through the transport deceleration line 16*b* in an incomplete operation state, and immediately increases the transport speed of the workpiece after the operations on workpieces A and B present between the operation limit line 16*a* and the transport acceleration line 16*c* have completed. As a result, even if workpieces are densely crowded near the upstream side of the transport deceleration line 16*b*, since the transport of the workpieces is accelerated after the operations have been performed on the densely crowded workpieces, unnecessary acceleration/deceleration control can be suppressed. Note that the transport speed at the time of deceleration may be 0 (transport stoppage). Alternately, as described below, the transport speed may be determined based on a prediction as to whether or not a workpiece will pass through the operation limit line 16*a*.

Referring again to FIG. 1, the machine system 1 may comprise a first sensor 17 which monitors the transport control line in order to control the transport speed of the workpiece 10. The first sensor 17 may be a two-dimensional camera or three-dimensional camera which is capable of detecting the workpiece 10. Using the first sensor 17, the machine system 1 may perform determination as to whether or not the workpiece 10 has passed through the transport deceleration line 16*b* in an incomplete operation state, or may perform determination as to whether or not the operation on the workpiece 10 present between the operation limit line 16*a* and the transport acceleration line 16*c* has completed.

Alternately, the machine system 1 may comprise a second sensor 18 which detects the arrival of the workpiece 10. The second sensor 18 may be a two-dimensional camera or three-dimensional camera which is capable of detecting the position, posture, and movement amount, of the workpiece 10, etc., or may be a photoelectric sensor or contact sensor which is capable of detecting only the position of the workpiece 10. When the latter sensor is used, in addition to the second sensor 18, the machine system 1 may comprise a third sensor 19 which is capable of detecting the movement amount of the workpiece 10. The third sensor 19 may be a rotary encoder or the like attached to a rotary shaft of the transport unit 14. The machine system 1 manages at least the current location of the workpiece 10 based on the information of the second sensor 18 and the information of the third sensor 19, in accordance with need, and without the use of the first sensor 17, based on at least the current location of the workpiece 10, may perform determination as to whether or not the workpiece 10 has passed through the transport deceleration line 16*b* in an incomplete operation state, or may perform determination as to whether or not the operation on the workpiece 10 present between the operation limit line 16*a* and the transport acceleration line 16*c* has completed.

Alternatively, when the reference position of the workpiece 10 is known, the machine system 1 manages the current location of the workpiece 10 based on the movement amount of the workpiece 10 acquired by the third sensor 19, without the use of the first sensor 17 or the second sensor 18, and based on at least the current location of the workpiece 10, may perform determination as to whether or not the workpiece 10 has passed through the transport deceleration line 16*b* in an incomplete operation state, or may perform determination as to whether or not the operation on the workpiece 10 present between the operation limit line 16*a* and the transport acceleration line 16*c* has completed.

Figure 3:
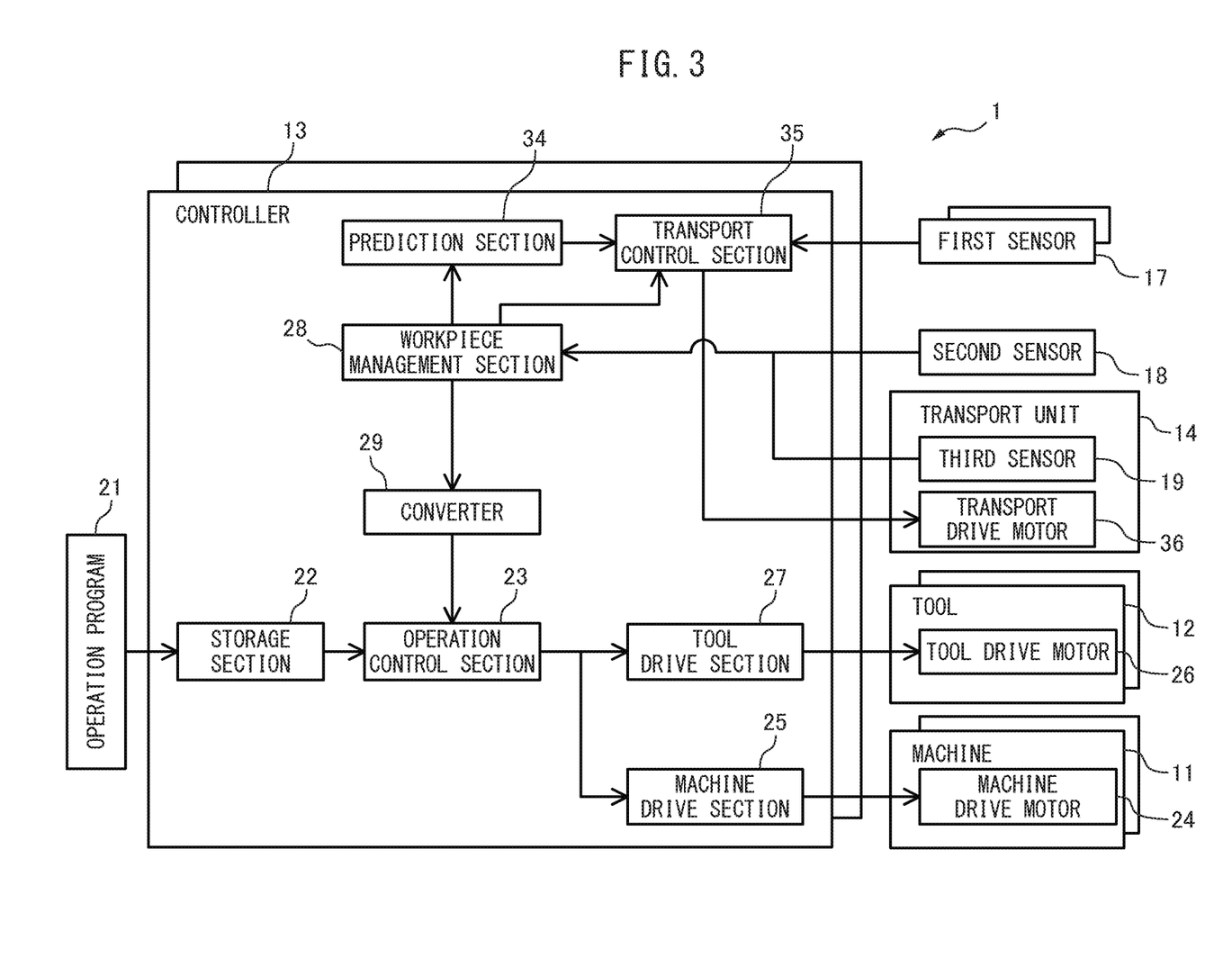
FIG. 3 is a block diagram of the machine system according to the embodiment.

FIG. 3 shows the configuration of the machine system 1 according to the present embodiment. The controller 13 comprises a storage section 22 which stores at least an operation program 21, an operation control section 23 which controls the operation of the machine 11 based on the operation program 21, a machine drive section 25 which drives a machine drive motor 24, and a tool drive section 27 which drives a tool drive motor 26. The operation program 21 is a program in which basic operation commands of the machine 11 are described in accordance with operation contents, and the operation control section 23 issues operations command to the machine drive section 25 or tool drive section 27 based on the operation program 21. The machine drive section 25 or tool drive section 27 supplies power to the machine drive motor 24 or tool drive motor 26 based on the operation commands.

The controller 13 further comprises a workpiece management section 28 which manages information (current location, posture, movement amount, operation state, etc.) of the workpiece, and a converter 29 which converts the information (current location, posture, movement amount, etc.) of the workpiece from a sensor coordinate system to a machine coordinate system. The workpiece management section 28 can manage at least the current location of the workpiece using only the second sensor 18, using the second sensor 18 and the third sensor 19, or using only the third sensor 19 when the reference position of the workpiece is known in advance. Further, when the machine system 1 comprises a plurality of machines 11, the workpiece management section 28 may manage operation distribution of the workpiece to the plurality of machines 11. The workpiece management section 28 may distribute a missed workpiece to a downstream machine 11 when, for example, the workpiece has passed through the operation limit line of the machine 11 in an incomplete operation state. The workpiece management section 28 may manage the information of the workpiece using a workpiece database as shown in, for example, the following table. The workpiece database is synchronized or shared among a plurality of controllers 13.

TABLE 1

| Article No. | Current Location | Operation Distribution | Operation State |
|---|---|---|---|
| 1 | X490, Y12 | Machine No. 2 | Incomplete |
| 2 | X460, Y15 | Machine No. 2 | Incomplete |
| 3 | X440, Y13 | Machine No. 2 | Incomplete |
| 4 | X380, Y14 | Machine No. 2 | Incomplete |

| Tray No. | Current Location | Placement Location 1 | Placement Location 2 | Placement Location 3 | Placement Location 4 | Operation State |
|---|---|---|---|---|---|---|
| 1 | X495, Y14 | N/A | N/A | N/A | N/A | Incomplete |
| 2 | X381, Y15 | N/A | N/A | N/A | N/A | Incomplete |

| Workplace Movement Amount |
|---|
| 20 cm/s |

| Machine No. | Operational Area | Transport Acceleration Line | Transport Deceleration Line | Operation Limit Line |
|---|---|---|---|---|
| 1 | X200-X300 | X250 | X270 | X300 |
| 2 | X400-X500 | X450 | X470 | X500 |

When a workpiece arrives within the operational area, the workpiece management section 28 continuously transmits the information (current location, posture, movement amount, etc.) of the workpiece to the converter 29, and the converter continuously converts the information (current location, posture, movement amount, etc.) of the workpiece from the sensor coordinate system to the machine coordinate system. The operation control section 23 continuously transmits, to the machine drive section 25 and the tool drive section 27, operation commands including a target operation (target position, target speed, target posture, etc.) of the machine in accordance with the information (current location, posture, movement amount, etc.) of the workpiece. As a result, the machine 11 can perform the operation while pursuing the workpiece. When the operation on the specific workpiece has completed, the workpiece management section 28 continuously transmits the information (current location, posture, movement amount, etc.) of a subsequent workpiece to the converter 29, and the process described above is repeated. When the workpiece management section 28 manages the information (current location, posture, movement amount, etc.) of the workpiece in the machine coordinate system, the converter 29 may be provided between each sensor and the workpiece management section 28.

The controller 13 further comprises a transport control section 35 which controls the transport of the workpiece based on the aforementioned transport control lines. Using only the first sensor 17, or using the information of the workpiece management section 28, the transport control section 35 may perform determination as to whether or not the workpiece has passed through the transport deceleration line in an incomplete operation state, or may perform determination such as whether or not the workpiece present between the operation limit line and the transport acceleration line has completed. When the first sensor 17 is used, the transport control section 35 may perform these determinations by detecting the workpiece by applying, for example, pattern matching or blob detection to the information of the first sensor 17.

When the information of the workpiece management section 28 is used, the transport control section 35 may determine whether or not article No. 1 has passed through the transport deceleration line in an incomplete operation state by, for example, referencing the workpiece database described above, and comparing the current location (X490) of article No. 1 with the position (X470) of the transport deceleration line of machine No. 2. Furthermore, the transport control section 35 references, for example, the workpiece database described above, and may determine, from the operation state (incomplete), that the operations on article No. 1 (X490) and article No. 2 (X460) present between the position (X500) of the operation limit line and the position (X450) of the transport acceleration line have completed.

Furthermore, the transport control section 35 may determine whether or not tray No. 1 has passed through the transport deceleration line in an incomplete operation state by, for example, referencing the workpiece database described above, and comparing the current location (X410) of tray No. 1 with the position (X470) of the transport deceleration line of machine No. 2, and determining the presence or absence of articles in placement locations 1 to 4. Further, the transport control section 35 references, for example, the workpiece database described above, and may determine, from the operation stare (incomplete), whether or not the operation on tray No. 1 (X495) present between the position (X500) of the operation limit line and the position (X450) of the transport acceleration line has completed.

The transport control section 35 performs the same transport control even in embodiments in which another operation, such as sealing or welding, is performed. The transport control section 35 references, for example, the workpiece database described above, and may determine, from the operation state, whether or not the operation at the sealing location or welding location of the workpiece has completed by comparing the current location of the workpiece with the position of the transport deceleration line. Furthermore, the transport control section 35 references, for example, the workpiece database described above, and may determine, from the operation state, whether or not the operation on the workpiece present between the operating limit line and the transport acceleration line has completed.

Alternatively, the transport control section 35 may receive a notification that the workpiece has passed through the transport deceleration line in an incomplete operation state from the workpiece management section 28, or may receive a notification that the operation on the workpiece present between the operation limit line and the transport acceleration line has completed from the workpiece management section 28. The transport control section 35 reduces the speed of the transport drive motor 36 when the workpiece has passed through the transport deceleration line in an incomplete operation state and increases the speed of the transport drive motor 36 when the operation on the workpiece present between the operation limit line and the transport acceleration line has completed.

The controller 13 may comprise a prediction section 34 which predicts whether or not the workpiece will pass through the operation limit line in an incomplete operation state based on the information of the workpiece management section 28 and the cycle time of the machine 11, and determines the transport speed of the workpiece based on the prediction results. The prediction section 34 predicts whether or not article No. 2 will pass through the operation limit line in an incomplete operation state by, for example, referencing the workpiece database described above, calculating the arrival time $(t_2-d_2/v)$ at which article No. 2 will arrive at the operation limit line based on the movement amount (v=20 cm/s) of the workpiece and the distance $(d_2=X500-X460)$ of article No. 2 to the operation limit line, and comparing the arrival time $(t_2)$ with the cycle time (c) $(t_2-c>0)$. Further, the prediction section 34 performs the same prediction for article No. 3 to arrive next $(t_3-2c>0)$. When it is predicted that article No. 3 will pass through the operation limit line in an incomplete operation state $(t_3-2c\leq0)$, the transport control section 35 can determine the transport speed $(v'<d_3/2c)$ so that article No. 3 does not pass through the operation limit line in an incomplete operation state, and decelerate or accelerate to the determined transport speed.

Figure 4:
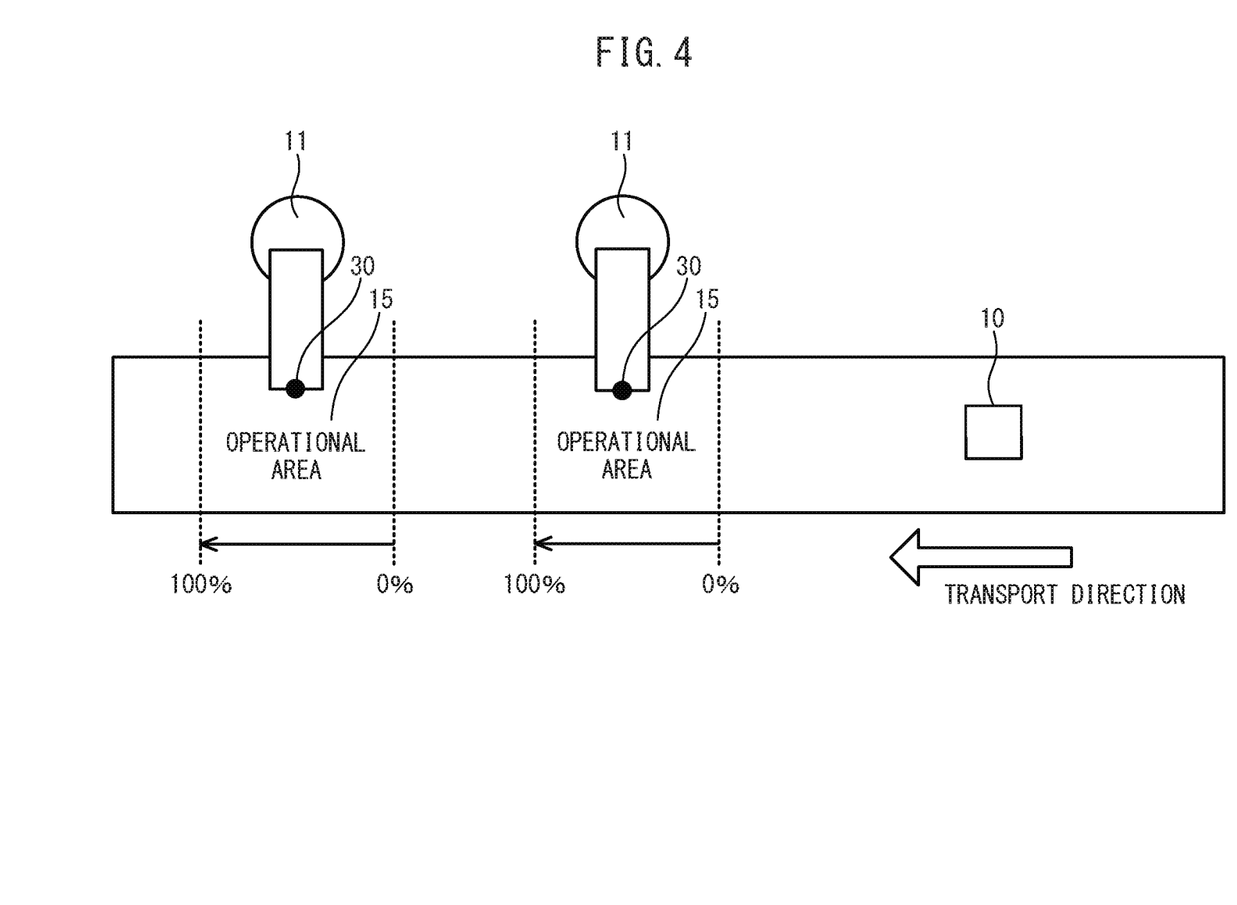
FIG. 4 is a plan view showing another example of workpiece transport speed control.

Alternatively, the transport speed of the workpiece may be controlled as described below regardless of the prediction of passage through the operation limit line described above. FIG. 4 shows another example of transport speed control of the workpiece 10. The transport control section 35 may control the transport speed of the workpiece 10 based on the current location 30 of the machine 10 relative to the operational area 15. Specifically, the transport control section 35 may control the transport speed of the workpiece 10 based on whether the machine 11 is currently operating upstream or currently operating downstream of the operational area 15. For example, when the location most upstream of the operational area 15 of the machine 11 is defined as 0%, and the location most downstream is defined as 100%, control may be performed such that the transport speed of the workpiece 10 is increased when the current relative position 30 of the machine 11 is less than 50% and is decreased when it is greater than 50%. Note that in such workpiece 10 transport control, the transport speed of the workpiece 10 may be further reduced when the workpiece 10 passes through the transport deceleration line in an incomplete operation state, and the transport speed of the workpiece 10 may be increased when the operation on the workpiece 10 is completed up to the transport acceleration line upstream of the transport deceleration line.

Figure 5:
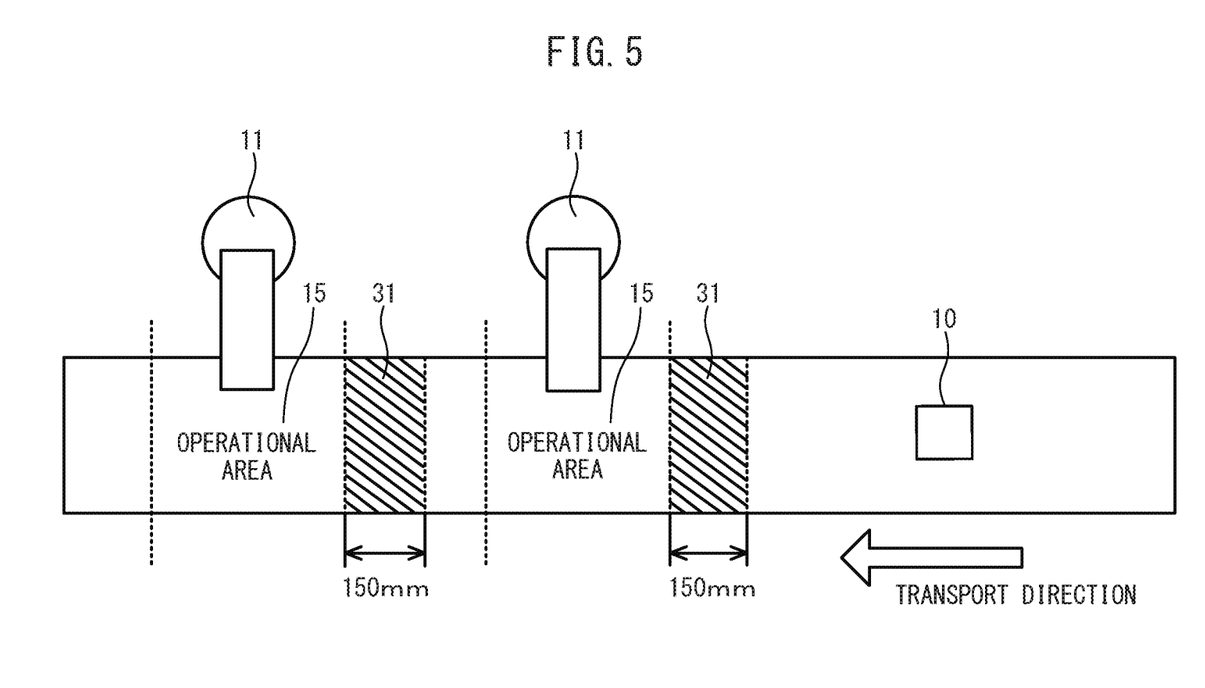
FIG. 5 is a plan view showing yet another example of Workpiece transport speed control.

FIG. 5 shows yet another example of transport speed control of the workpiece 10. The transport control section 35 may calculate an expected operation rate of the machine 11 and control the transport speed of the workpiece 10 based on the expected operation rate. In the calculation of the expected operation rate of the machine 11, the number of workpieces present in a designated area 31 may be used. For example, when the area 150 mm on the upstream side of the operational area 15 of the machine 11 is set as the designated area 31, two workpieces 10 are present in the designated area 31, the transport speed of the workpiece 10 is set to 300 mm/s, and operations on the workpiece 10 are evenly distributed between two machines 11, since the upstream side machine 11 performs the operation on one workpiece 10, the expected operation rate of the machine 11 can be calculated as 1 [workpiece]×300 [mm/s]/150 [mm]=2 [workpiece/s]=120 [workpiece/min]. When the operation capacity of the machine 11 is 150 [workpiece/min], by changing the transport speed of the workpiece 10 to 375 mm/s by performing multiplication by a multiplication factor of 1.25–fol=150 [workpiece/min]/120 [workpiece/min], the expected operation rate of the machine 11 can be increased to 1 [workpiece]×375 [mm/s]/150 [mm]=2.5 [workpiece/s]=150 [workpiece/min]. Specifically, the original operation capacity of the machine 11 can be maximized. Note that in such workpiece 10 transport control, the transport speed of the workpiece 10 may be further reduced when the workpiece 10 passes through the transport deceleration line in an incomplete operation state, and the transport speed of the workpiece 10 may be increased when the operation on the workpiece 10 is completed up to the transport acceleration line upstream of the transport deceleration line.

Figure 6:
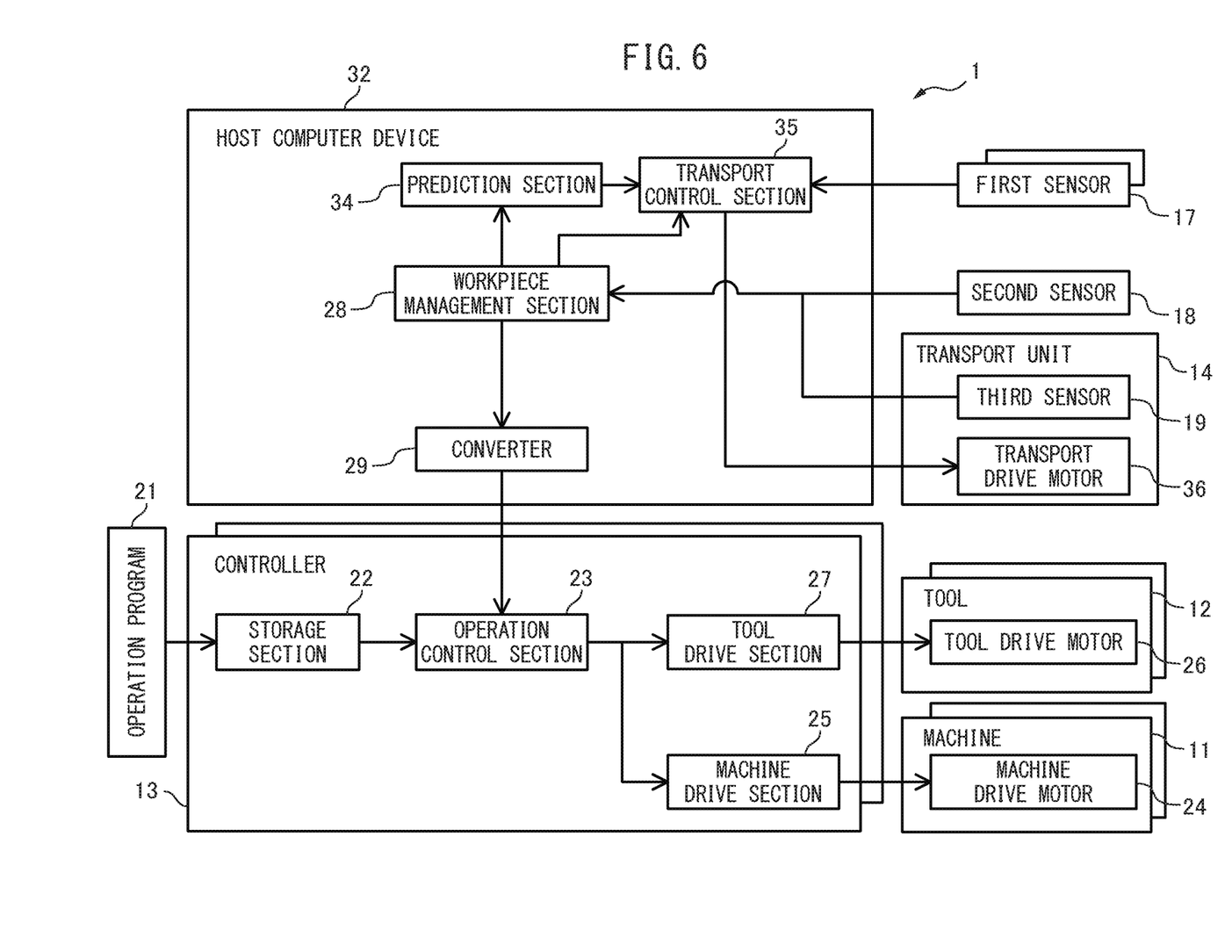
FIG. 6 is a block diagram of a machine system according to another embodiment.

FIG. 6 shows the configuration of a machine system 1 according to another embodiment. In this configuration, the machine system 1 comprises a host computer device 32, and the host computer device 32 is communicably connected to each controller 13. The host computer device 32 is configured so as to process the information from each sensor, such as the first sensor 17, the second sensor 18, and the third sensor 19, at high speed, and issue various commands to each controller 13 based on the processing results. The workpiece management section 28, the converter 29, the transport control section 35, and the prediction section 34 are not individually provided in each controller, but are integrated in the host computer device 32. As a result, various programs and various data can be shared between the plurality of controllers 13, whereby the maintainability of the machine system 1 can be increased.

Figure 7:
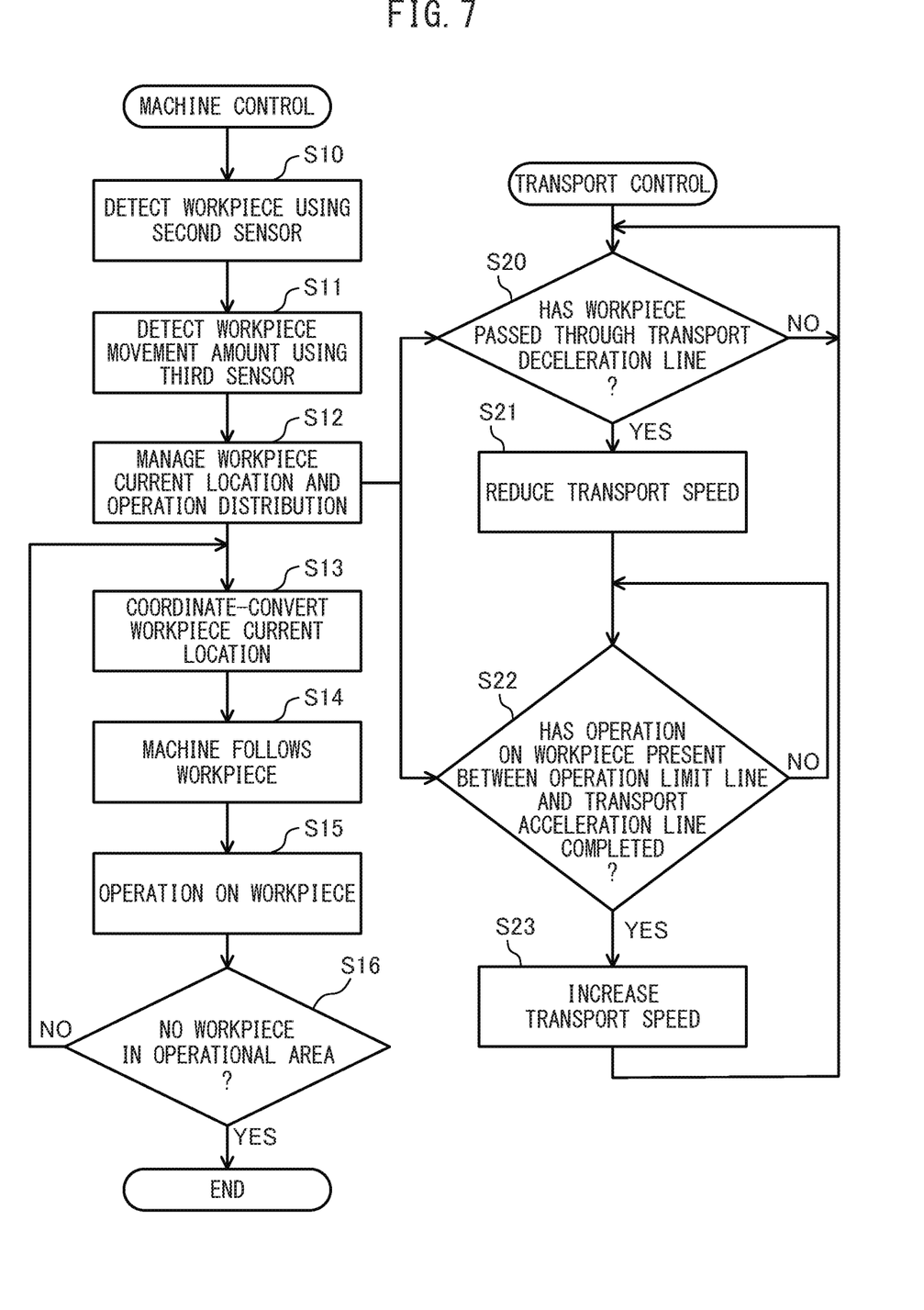
FIG. 7 is a flowchart showing the schematic operations of the machine system.

FIG. 7 shows the schematic operations of the machine system 1. The machine system may perform machine control and transport control in different flows. In machine control, first, in step S10, at least the position of the workpiece is detected using the second sensor, and in step S11, the movement amount of the workpiece is detected using the third sensor. However, when the second sensor can also detect the movement amount of the workpiece, since the current location of the workpiece can be managed by the second sensor alone, the process of step S11 is unnecessary. Furthermore, when the reference position of the workpiece is known in advance, since the current location of the workpiece can be managed by the third sensor alone, the process of step S10 is unnecessary.

In step S12, at least the current location of the workpiece is managed. When a plurality of machines are provided, the operation distribution of workpieces to the plurality of machines may be managed. In step S13, at least the current location of the workpiece is coordinate-converted from the sensor coordinate system to the machine coordinate system. However, when the information (current location, posture, movement amount, etc.) of the workpiece is managed in the machine coordinate system, the process of step S13 may be performed between step S11 and step S12.

In step S14, the machine pursues the workpiece based on the information (current location, posture, movement, amount, etc.) of the workpiece. In step S15, the operation on the workpiece is performed using the tool. In step S16, the presence or absence of the workpiece within the operation area is determined. When it is determined that there are no workpieces which should be operated on within the operational area (YES in step S16), the process ends, and when it is determined that there is a workpiece which should be operated on within the operational area (NO in step S16), the process returns to step S13, and the operation is repeated for the subsequent workpiece.

In transport control, first, in step S20, it is determined whether or not the workpiece has passed through the transport deceleration line in an incomplete operation state based on at least the current location of the workpiece. However, in step S20, determination may be performed using the first sensor. When it is determined that the workpiece has not passed through the transport deceleration line in an incomplete operation state (NO in step S20), the process of step S20 is repeated. When it is determined that the workpiece has passed through the transport deceleration line in an incomplete operation state (YES in step S20), in step S21, the transport speed is reduced. In machine control, the operation on the workpiece present between the operation limit line and the transport acceleration line is performed during deceleration.

In step S22, it is determined whether or not the operation on the workpiece present between the operation limit line and the transport acceleration line has completed based on at least the current location of the workpiece. However, step S22 may be performed on the machine control side, and may be a step in which a notification that the operation on the workpiece present between the operation limit line and the transport acceleration line has completed is received. When the operation on the workpiece present between the operation limit line and the transport acceleration line has not completed (NO in step S22), the process of step S22 is repeated. When the operation on the workpiece present between the operation limit line and the transport acceleration line has completed (YES in step S22), in step S23, the transport speed is increased.

According to the above embodiments, even if workpieces are densely crowded near the upstream side of the transport deceleration line, since the transport of the workpieces is accelerated after the operation on the densely crowded workpieces has finished, unnecessary transport, control of the workpieces can be suppressed.

The "sections" described above may be constituted by semiconductor integrated circuits, or may be constituted by programs which are executed by a processor. Furthermore, the program for executing the flowcharts described above may be stored and provided on a computer-readable non-transitory storage medium, for example, a CD-ROM.

Though various embodiments have been described in the present description, the present invention is not limited to the embodiments described above, and various modifications can be made within the scope described in the claims below.

The invention claimed is:

1. A machine system, comprising:
a machine which performs an operation on a workpiece passing through an operational area, and
a transport control section which controls transport of the workpiece based on a transport deceleration line provided upstream of an operation limit line of the machine in a direction of travel of the workpiece and a transport acceleration line provided upstream of the transport deceleration line, wherein
the transport control section reduces a transport speed of the workpiece when the workpiece passes through the transport deceleration line in an incomplete operation state and increases the transport speed of the workpiece after the operation on the workpiece present between the operation limit line and the transport acceleration line has completed.

2. The machine system according to claim 1, further comprising a first sensor which monitors the transport deceleration line and the transport acceleration line, wherein the transport control section determines whether or not the workpiece has passed through the transport deceleration line in an incomplete operation state based on information of the first sensor.

3. The machine system according to claim 1, further comprising a second sensor which detects the workpiece arriving at the operational area, and a workpiece management section which manages at least a current location of the workpiece based on at least information of the second sensor, wherein the transport control section determines whether or not the workpiece has passed through the transport deceleration line in an incomplete operation state based on information of the workpiece management, section.

4. The machine system according to claim 3, further comprising a third sensor which detects a movement amount of the workpiece.

5. The machine system according to claim 2, further comprising a third sensor which detects a movement amount of the workpiece, and a workpiece management section which manages at least a current location of the workpiece based on at least information of the third sensor, wherein the transport control section determines whether or not the workpiece has passed through the transport deceleration line in an incomplete operation state based on information of the workpiece management section.

6. The machine system according to claim 5, comprising a plurality of the machines, wherein the workpiece management section further manages operation distribution of the workpiece to the plurality of the machines.

7. The machine system according to claim 5, comprising a plurality of the machines, wherein each of the machines is provided with the operation limit line, and when the workpiece has passed through the operation limit line in an incomplete operation state, the workpiece management section distributes the passed workpiece to a downstream machine.

8. The machine system according to claim 5, further comprising a prediction section which predicts whether or not the workpiece will pass through the operation limit line in an incomplete operation state based on the information of the workpiece management section and a cycle time of the machine, wherein the transport control section determines a transport speed of the workpiece based on the prediction.

9. The machine system according to claim 1, wherein the transport control section controls the transport speed of the workpiece based on a relative current location of the machine relative to the operational area.

10. The machine system according to claim 1, wherein the transport control section controls the transport speed of the workpiece based on an expected operation rate of the machine.

11. The machine system according to claim 1, comprising a plurality of the machines, wherein only the machine arranged most downstream among the plurality of the machines is provided with the transport deceleration line and the transport acceleration line.

12. The machine system according to claim 1, wherein the operation limit line is provided downstream within the operational area in the direction of travel of the workpiece.

13. The machine system according to claim 1, wherein the machine performs the operation while pursuing the workpiece based on at least a current location of the workpiece.

14. The machine system according to claim 1, wherein the workpiece comprises an article or a tray on which the article can be placed.

15. The machine system according to claim 1, wherein the machine comprises a robot or an industrial machine.

* * * * *

UNITED STATES PATENT AND TRADEMARK OFFICE
CERTIFICATE OF CORRECTION

| | |
|---|---|
| PATENT NO. | : 11,278,997 B2 |
| APPLICATION NO. | : 16/992388 |
| DATED | : March 22, 2022 |
| INVENTOR(S) | : Masafumi Ooba and Kentaro Koga |

It is certified that error appears in the above-identified patent and that said Letters Patent is hereby corrected as shown below:

In the Claims

Column 10, Line 41, Claim 5, delete "claim 2" and insert -- claim 1 --

Signed and Sealed this
Seventh Day of June, 2022

Katherine Kelly Vidal
*Director of the United States Patent and Trademark Office*